Patented Oct. 25, 1932

1,885,024

UNITED STATES PATENT OFFICE

WILLIAM W. LEWERS, OF FLINT, MICHIGAN, AND GORDON D. PATTERSON, OF WILMINGTON, DELAWARE, ASSIGNORS TO E. I. DU PONT DE NEMOURS & COMPANY, OF WILMINGTON, DELAWARE, A CORPORATION OF DELAWARE

COATING COMPOSITION

No Drawing.    Application filed February 24, 1930. Serial No. 431,040.

This invention relates to the art of coating compositions, and more particularly to coating compositions that are substantially free from cellulose derivatives and yet are resistant to outside atmospheric influences.

We have discovered that, by using polyhydric alcohol-polybasic acid resins of certain types indicated hereinafter, as the vehicle, it is possible to produce a wide range of pigmented coating compositions for outside use that possess many advantages which it has not been possible to obtain with paints using drying oil or varnish type vehicles.

We have also discovered that by the use of resins of this type it is possible to utilize, in coating compositions which are resistant to outside atmospheric influences, pigments and pigment combinations which are not satisfactory when used with drying oil or varnish type vehicles.

It is therefore an object of this invention to produce new and useful pigmented coating compositions.

It is another object of this invention to produce pigmented coating compositions which have better resistance to chalking, checking and cracking, as well as a more rapid drying rate.

It is a further object of this invention to produce durable coating compositions which may be made up with single pigments.

It is a still further object of this invention to produce durable coating compositions which will form films that have higher percentages of pigments than has heretofore been possible, in order to obtain high hiding power with fewer coats.

It is also an object of this invention to produce non-toxic coating compositions suitable for outside use.

It is a special object of this invention to produce coating compositions that are especially resistant to outside atmospheric influences.

It is a further special object of this invention to produce durable coating compositions for outside use which contain titanium as the principal pigment.

It is also an object of this invention to produce coating compositions which form films that chalk at a rate which is substantially proportional to the rate of accumulation of dirt.

With the above and other objects in view, which will be apparent as the description proceeds, we have set forth our invention in the following specification and have included the following examples of paint and enamel compositions embodying our invention by way of illustration and not as a limitation:

Example 1.—Mixed pigment white paint

| | Parts by weight |
|---|---|
| Barium base titanium pigment | 111 |
| Zinc oxide | 60 |
| Resin A (acid No. 5.2) | 100 |
| Cobalt linoleate | 0.4 |
| Manganese linoleate | 0.4 |
| Mineral thinner | 37.2 |
| Turpentine | 12.4 |
| Solvent naphtha | 9.3 |
| Butyl alcohol | 3.1 |
| Total | 333.8 |

Resin A used in the above composition was formed from the following ingredients using the proportions indicated:

| | Parts by weight |
|---|---|
| Glycerol | 17.11 |
| Linseed oil acids | 55.80 |
| Phthalic anhydride | 27.09 |
| Total | 100.00 |

Example 2.—Single pigment white paint

| | Parts by weight |
|---|---|
| Barium base titanium pigment | 268 |
| Resin A (acid No. 8) | 100 |
| Cobalt linoleate | 0.4 |
| Manganese linoleate | 0.4 |
| Mineral thinner | 73 |
| Total | 441.8 |

*Example 3.—Mixed pigment white paint*

| | Parts by weight |
|---|---|
| Barium base titanium pigment | 118 |
| Basic carbonate white lead | 64 |
| Resin A (acid No. 5.2) | 100 |
| Cobalt linoleate | 0.4 |
| Manganese linoleate | 0.4 |
| Mineral thinner | 70 |
| Total | 352.08 |

*Example 4.—Mixed pigment white paint*

| | Parts by weight |
|---|---|
| Calcium base titanium pigment | 140 |
| Zinc oxide | 21 |
| Resin A (acid No. 8) | 100 |
| Cobalt linoleate | 0.4 |
| Manganese linoleate | 0.4 |
| Mineral thinner | 73 |
| Total | 334.8 |

*Example 5.—Mixed pigment white paint*

| | Parts by weight |
|---|---|
| Zinc oxide | 126 |
| Lithopone base titanium pigment | 68 |
| Resin A (acid No. 1.3) | 100 |
| Cobalt linoleate | 0.4 |
| Manganese linoleate | 0.4 |
| Mineral thinner | 70 |
| Total | 364.8 |

*Example 6.—Single pigment white paint*

| | Parts by weight |
|---|---|
| Titanium oxide | 143 |
| Resin A (acid No. 8) | 100 |
| Cobalt linoleate | 0.4 |
| Manganese linoleate | 0.4 |
| Mineral thinner | 73 |
| Total | 316.8 |

*Example 7.—Single pigment white paint*

| | Parts by weight |
|---|---|
| Zinc oxide | 204 |
| Resin A (acid No. 1.3) | 100 |
| Cobalt linoleate | 0.4 |
| Manganese linoleate | 0.4 |
| Mineral thinner | 117 |
| Total | 421.8 |

*Example 8.—Mixed pigment white paint*

| | Parts by weight |
|---|---|
| Zinc oxide | 126 |
| Basic carbonate white lead | 68 |
| Resin A (acid No. 1.3) | 100 |
| Cobalt linoleate | 0.4 |
| Manganese linoleate | 0.4 |
| Mineral thinner | 70 |
| Total | 364.8 |

*Example 9.—Buff paint*

| | Parts by weight |
|---|---|
| Zinc oxide | 126 |
| Basic carbonate white lead | 68 |
| French ochre | 16 |
| Resin A (acid No. 1.3) | 100 |
| Cobalt linoleate | 0.4 |
| Manganese linoleate | 0.4 |
| Mineral thinner | 70 |
| Total | 380.8 |

*Example 10.—Mixed pigment white paint*

| | Parts by weight |
|---|---|
| Zinc sulfide | 110 |
| Basic carbonate white lead | 90 |
| Resin A (acid No. 5.2) | 100 |
| Cobalt linoleate | 0.4 |
| Manganese linoleate | 0.4 |
| Mineral thinner | 75 |
| Total | 375.8 |

*Example 11.—Mixed pigment blue paint*

| | Parts by weight |
|---|---|
| Lithopone | 110 |
| Basic carbonate white lead | 87 |
| Ultramarine blue | 3 |
| Resin A (acid No. 5.2) | 100 |
| Cobalt linoleate | 0.4 |
| Manganese linoleate | 0.4 |
| Mineral thinner | 60 |
| Total | 360.8 |

*Example 12.—Mixed pigment white paint*

| | Parts by weight |
|---|---|
| Barium base titanium pigment | 118 |
| Basic sulfate white lead | 62 |
| Resin A (acid No. 5.2) | 100 |
| Cobalt linoleate | 0.4 |
| Manganese linoleate | 0.4 |
| Mineral thinner | 70 |
| Total | 350.8 |

*Example 13.—Mixed pigment white paint*

| | Parts by weight |
|---|---|
| Barium base titanium pigment | 101 |
| Lithopone | 39.4 |
| Zinc oxide | 15.6 |
| Resin B (acid No. 2.5) | 100 |
| Cobalt linoleate | 0.4 |
| Manganese linoleate | 0.4 |
| Mineral thinner | 62 |
| Total | 318.8 |

Resin B used in the above composition was formed from the following ingredients using the proportions indicated:

| | Parts by weight |
|---|---|
| Glycerol | 13.43 |
| Linseed oil acids | 72.06 |
| Phthalic anhydride | 14.51 |
| Total | 100.00 |

*Example 14.—Single pigment white enamel*

| | Parts by weight |
|---|---|
| Barium base titanium pigment | 112 |
| Resin C (acid No. 50) | 100 |
| Cobalt linoleate | 0.4 |
| Solvent naphtha | 130 |
| Total | 342.4 |

Resin C used in the above composition was formed from the following ingredients using the proportions indicated:

| | Parts by weight |
|---|---|
| Glycerol | 22.73 |
| Phthalic anhydride | 46.31 |
| Linseed oil acids | 30.96 |
| Total | 100.00 |

*Example 15.—Mixed pigment white paint*

| | Parts by weight |
|---|---|
| Barium base titanium pigment | 111 |
| Zinc oxide | 60 |
| Resin D (acid No. 5.2) | 100 |
| Cobalt linoleate | 0.4 |
| Manganese linoleate | 0.4 |
| Mineral thinner | 37.2 |
| Turpentine | 12.4 |
| Solvent naphtha | 9.3 |
| Butyl alcohol | 3.1 |
| Total | 333.8 |

Resin D used in the above composition was formed from the following ingredients using the proportions indicated:

| | Parts by weight |
|---|---|
| Glycerol | 11.87 |
| Phthalic anhydride | 28.03 |
| Linseed oil | 60.10 |
| Total | 100.00 |

*Example 16.—Single pigment white paint*

| | Parts by weight |
|---|---|
| Barium base titanium pigment | 156 |
| Resin E (acid No. 5) | 100 |
| Cobalt linoleate | 0.4 |
| Manganese linoleate | 0.4 |
| Mineral thinner | 65 |
| Solvent naphtha | 65 |
| Total | 386.8 |

Resin E used in the above composition was formed from the following ingredients using the proportions indicated:

| | Parts by weight |
|---|---|
| Glycerol | 11.87 |
| Perilla oil | 60.10 |
| Phthalic anhydride | 28.03 |
| Total | 100.00 |

*Example 17.—Mixed pigment white paint*

| | Parts by weight |
|---|---|
| Barium base titanium pigment | 118 |
| Basic carbonate white lead | 64 |
| Resin F (acid No. 2.7) | 100 |
| Cobalt linoleate | 0.4 |
| Manganese linoleate | 0.4 |
| Mineral thinner | 70 |
| Total | 352.8 |

Resin F used in the above composition was formed from the following ingredients using the proportions indicated:

| | Parts by weight |
|---|---|
| Glycerol | 16.30 |
| Phthalic anhydride | 27.24 |
| Linseed oil acids | 47.10 |
| China wood oil | 9.36 |
| Total | 100.00 |

*Example 18.—Single pigment white paint*

| | Parts by weight |
|---|---|
| Barium base titanium pigment | 156 |
| Resin G (acid No. 5) | 100 |
| Cobalt linoleate | 0.4 |
| Manganese linoleate | 0.4 |
| Mineral thinner | 80 |
| Total | 336.8 |

Resin G used in the above composition was formed from the following ingredients using the proportions indicated:

| | Parts by weight |
|---|---|
| Glycerol | 16.30 |
| Phthalic anhydride | 27.24 |
| Linseed oil acids | 47.10 |
| Soya bean oil | 9.36 |
| Total | 100.00 |

*Example 19.—Single pigment white paint*

| | Parts by weight |
|---|---|
| Barium base titanium pigment | 156 |
| Resin H (acid No. 11.2) | 100 |
| Cobalt linoleate | 0.4 |
| Manganese linoleate | 0.4 |
| Mineral thinner | 70 |
| Total | 326.8 |

Resin H used in the above composition was formed from the following ingredients using the proportions indicated:

| | Parts by weight |
|---|---|
| Glycerol | 14.60 |
| Phthalic anhydride | 21.80 |
| Linseed oil acids | 36.10 |
| China wood oil acids | 9.03 |
| Congo gum | 18.47 |
| Total | 100.00 |

The coating compositions set forth above, as well as other coating compositions falling within the scope of the present invention, are prepared by grinding or dispersing the pigment or pigment combination with the resin in the presence of sufficient solvent and diluent to provide a consistency suited to the dispersing device used. After dispersion the paint is reduced to application consistency with additional solvent or diluent. The drier may be added at any desired point in the preparation of the coating composition.

Where desired, extenders or fillers, such as blanc fixe, barytes, silica, asbestine, whiting, talc and china clay, may be incorporated in the coating compositions falling within the scope of the present invention.

The polyhydric alcohol-polybasic acid resins referred to above may be made in any well known manner as, for example, by heating the ingredients at any suitable temperature above the melting point of the materials until resinification is complete. In the preparation of resins of unusually light color, it has been found preferable to carry out the reaction in the presence of an inert gas. If desired, refluxing or partial refluxing may be resorted to or the operation may be carried out at elevated or reduced pressures. Where oil is used in place of oil acids, it is desirable, in order to obtain a homogeneous product, to heat the oil and glycerol together before adding the phthalic anhydride. Other modifying ingredients, if used, may be added in either stage.

In general it is advisable to maintain the acid number of the resin at the lowest possible value, and this is usually accomplished by increasing the temperature or the period of heating, but stopping before the gel point is reached. In certain cases in which an extremely low acid number is unnecessary, the heating is stopped when a low enough acid number is obtained, in order to avoid unduly increasing the viscosity of the resin. The allowable range of acid numbers will vary with the type of polyhydric alcohol-polybasic acid resin used and also with the type and quantity of pigment. With chemically active pigments, like zinc oxide or basic carbonate white lead, the acid number should preferably be below 20. With chemically inert pigments, like barium base titanium pigments, the question of acid number is not as important as in the case of chemically active pigments, and in exceptional cases we have successfully formed durable outside coating compositions using resins having an acid number as high as 50, as indicated in Example 14. In general, we prefer to maintain the acid number below 30 for resins having a combined oil acids content of 35% or more. Below this oil acids content the acid number should preferably be at the lowest value at which it is possible to prepare the resin. In any case the acid number must be low enough to avoid instability of the liquid composition as evidenced by livering or gelling induced by chemically reactive pigments.

By the term "modified polyhydric alcohol-polybasic acid resin", as used herein, we mean the resinous condensation product resulting from the reaction of one or more polyhydric alcohols and one or more polybasic acids with one or more of the following modifying ingredients: drying oils, semi-drying oils, synthetic drying oils, and monobasic acids, especially those derived from drying oils and semi-drying oils, synthetic drying oil acids, and mixtures of one or more of these modifying ingredients with natural resins, as well as equivalent resinous condensation products, such as those resulting from the reaction of polybasic acids and partially acylated polyhydric alcohols where the acylating material is one or more of the acidic modifying ingredients referred to above.

By the term "modifying agent", as used herein, we mean an ingredient, of the type mentioned in the definition of "modified polyhydric alcohol-polybasic acid resin" in the preceding paragraph, other than a polyhydric alcohol or a polybasic acid.

By the term "oil modified", as used herein, we mean that the product referred to is chemically modified by one or more drying oils, semi-drying oils, synthetic drying oils, drying oil acids, semi-drying oil acids, and/or synthetic drying oil acids.

As indicated by the above examples it will be apparent that our invention is applicable in connection with a wide range of oil modified polyhydric alcohol-polybasic acid resins, and our work has indicated that the modifying ingredients may vary over a wide range, although we prefer that they be used in amounts equal to from approximately 22 to 82% of the total composition where the modifying agent is linseed oil acids, and over slightly narrower ranges where the linseed oil acids are replaced, in whole or in part, by other drying oil acids or by drying oils, or by mixtures of drying oil acids and either semi-drying oils or natural resins. Where linseed oil acids are replaced by other modifying agents, as indicated above, we have found it desirable to make these replacements on a molecular weight basis in order to obtain substantially equivalent results, although substitutions which are not made strictly on a molecular weight basis may be resorted to without sacrificing many of the desirable advantages of our invention.

Since straight polyhydric alcohol-polybasic acid resins contain no glycerides of oil acids, and oil type vehicles are lergely glycerides of oil acids, it will be apparent that the major improvements which it is the purpose of this invention to accomplish are attained where a substantial amount of oil acids, or their equivalent, is introduced into the resins used. However, where the amount of oil acids is very high, so that only a small amount of phthalic anhydride is included, the improvement in durability over oil type compositions is slight, but the improvement becomes more noticeable as the quantity of phthalic anhydride is increased, provided a substantial amount of oil acids, or their equivalent, is present.

Resins high in combined oil acids content can be used successfully over any type of surface to which oil or varnish paints can be applied. However, resins of lower combined oil acids content are less well adapted than those of higher combined oil acids content for use on surfaces which are subjected to severe expansion or contraction, such as occurs in soft woods like white pine under the influence of moisture. The lower oil length resins, however, are admirably suited for use over surfaces such as metal and have been successfully applied directly to steel without a preliminary system of undercoat films such as are ordinarily required. Resins low in combined oil acids content, which produce pigmented films having the same drying time as short oil varnishes, develop markedly superior durability in comparison with the latter type products. For instance, the paint in Example 7 maintained excellent film condition for twelve months ove steel under severe exposure conditions, whereas several short oil varnish products having the same pigment combination and drying time failed within three months.

For use over wood we prefer, but do not restrict ourselves to, the range of 35% to 72% combined oil acids, expressed as linseed oil acids. For use over steel, or other metal, even lower oil acids contents can be used successfully, including compositions as low as 22% in oil acids. Where the combined oil acids content of the resin is as low as from 22% to 35%, expressed as linseed oil acids, however, the pigment combination should not contain more than 5% of chemically active pigments, such as zinc oxide or basic carbonate white lead. Furthermore, even in the range of from 35% to 45% combined oil acids, expressed as linseed oil acids, we find it is desirable to use a preponderance of chemically inert pigments as the film is sufficiently hard, and excessive hardness developed by chemically active pigments may cause too high a degree of brittleness.

In selecting resins for specific purpose paints, the principles pointed out above should be kept in mind.

Although the above examples have been limited to modified glyceryl phthalate resins we desire to have it understood that other polyhydric alcohol-polybasic acid resins having the general properties of those indicated may be substituted therefor.

Similarly, although the above examples stress the use of single pigment combinations, and are limited to the use of blue, white and yellow pigments, it will be obvious that any other desired colors, as well as various combinations of white pigments, may be used with advantageous results. It is an important advantage of compositions of the type set forth herein that when they include colored pigments but do not include any titanium oxide pigment the resulting films are unusually resistant to the fading which is characteristic of paints and enamels using drying oil or varnish type vehicles. Where titanium oxide pigments are used, however, it is preferable not to include colored pigments inasmuch as the more rapid chalking of titanium oxide pigments tends to cause fading and spoil the general appearance when this pigment is combined with colored pigments.

Although the driers used in the above examples have been calculated on the basis of .05% of the particular metal based on the drying oil content of the resin, it will be obvious that other percentages may be used and that other driers may be substituted for those indicated.

We have found it desirable, in order to improve the brushing viscosity, to utilize solvents having relatively high boiling points, preferably above 140° C. Although solvent mixtures containing a large proportion of mineral thinner and solvent mixtures containing both mineral thinner and aromatic solvents have been stressed as the solvents in the above examples, because these represent preferred solvent mixtures, other solvents, such as petroleum distillates of high boiling point, especially with the addition of high boiling point organic solvents, may be used.

For resins as high in combined oil acids content as 56%, aliphatic solvents, such as mineral thinner, may ordinarily be used. However, as this value is reduced, the partial substitution of aromatic solvents, such as xylol or solvent naphtha, is usually desirable in order to maintain the resins in solution and at low viscosity. In cases, as in Example 1, where brushing and flowing properties are important, the ease and time of brushing can be increased by incorporating high boiling solvents which prevent the early development of high viscosity in the film.

Inasmuch as polyhydric alcohol-polybasic acid resins prepared by different methods have different viscosities, we desire to have it understood that the proportion of solvent indicated in the above examples may be varied over relatively wide limits, depending on the particular resin used, its method of preparation, the pigment characteristics, and the method of applying the coating composition.

Heretofore the use of titanium oxide pigments in coating compositions for exposure to the weather has been limited because of the abnormal tendency of such pigments to chalk. This is so severe that oil films containing substantial amounts of titanium oxide pigments become thin and cease to hide or protect the under surface long before the average oil paint loses its protecting value. If a titanium oxide pigment is used alone in the usual linseed oil vehicle, such as is commonly used in high grade outside paints, the film is almost completely chalked away after three to six months' exposure, depending upon the severity of weathering and the thickness of the film. Thus, while basic carbonate white lead has been used for many years as a single pigment in oil paints, it was soon recognized that titanium oxide pigments could not be used in this way. Incorporation of zinc oxide with the titanium oxide pigment in linseed oil paints reduces the tendency of the film to chalk, but even the optimum proportions of these pigments are less durable in oil paint vehicles than the average outside paint, due to chalking of the film. The balancing of a formula containing zinc oxide and titanium oxide pigments is difficult, for insufficient zinc oxide leads to early chalking failure and an excess of this pigment causes the film to fail by cracking. Even at the optimum balance between severe chalking and the tendency to crack, an oil paint will ordinarily fail within one to one and one-half years on severely exposed surfaces, such as porch railings or window sills. Similarly pigmented coating compositions containing resin A do not fail in three years' exposure under the same conditions.

The failure of coating compositions containing oil type vehicles pigmented with titanium pigment and zinc oxide combinations is particularly noticeable when the zinc oxide content of the pigment combination is less than 20% or greater than 50%, whereas such pigment combinations are very durable when used with resin vehicles of the type disclosed herein. Example 4 represents a titanium-zinc oxide pigment combination containing approximately 15% zinc oxide, and Example 7 would represent a titanium-zinc oxide pigment combination containing 65% zinc oxide if 71.4 parts by weight of zinc oxide of said Example 7 were replaced by 71.4 parts by weight of barium base titanium pigment. It is therefore evident that titanium oxide pigments are subject to severe limitations when considered for exterior use in ordinary oil vehicles.

We have discovered that the excessive chalking characteristic of titanium oxide pigments with outside paint vehicles is reduced markedly when certain polyhydric alcohol-polybasic acid type resins are used the binding vehicle. In this way extremely durable coating compositions having unusually desirable properties can be prepared from titanium oxide pigments either alone or in combination with other pigments. Moreover, we have discovered that polyhydric alcohol-polybasic acid resin films containing major quantities of titanium oxide pigments are not subject to the checking and cracking failure characteristic of ordinary paint films. This is a remarkable property of the resin paints which we have developed for it insures a satisfactory surface for repainting. In addition, these paints are remarkable in that they combine unusual durability with slow, continuous and uniform chalking at a rate just sufficient to keep the surface of the paint free from deposited dirt particles. Thus the initial excellent whiteness and cleanliness of the film is maintained permanently. Furthermore, such chalking as does take place is uniformly distributed over the entire surface, thus avoiding unsightly inequalities in the coating. For example, the coating composition of Example 2, given above, has been found to be substantially resistant to chalking during the first two months' exposure and then begins to chalk at a relatively slow rate, but it does not show failure by chalking, checking or cracking after a total exposure of 30 months under severe conditions. A similarly formulated linseed oil paint leaves much of the wood exposed after seven months, due to chalking away.

It is another important advantage of compositions of the type set forth herein that they are markedly resistant to checking and cracking failures. For example, the composition of Example 7, given above, has been found not to check or crack materially until after 18 months severe exposure, whereas various other types of coating compositions, such as a similarly pigmented linseed oil film, have been found to fail under similar conditions of exposure within 3 months.

Coating compositions for exterior use, particularly whites, are frequently lacking in the power to hide the underlying surface when only one or possibly two coats are applied. An obvious means for improving hiding power lies in increasing the pigment content of the film but this has not been possible in oil type compositions because of the harmful effect upon durability (increased chalking or checking and cracking). By the use of resins of the type disclosed herein, however, we have found that it is possible to bind larger quantities of pigments than normally can be used in paints, thus permitting the development of films having unusually high hiding power, and the use of a lesser number of coats, or coats having a lesser thickness, to secure satisfactory hiding without sacrifice in the ultimate durability of the films.

Our improved compositions also form films which are more stable to sunlight and atmospheric influences and have better gloss retention than previous coating compositions.

We have also found that with coating compositions of the type set forth herein the surface drying takes place at a sufficiently rapid rate to keep the paint clean during the early stages of drying, thus avoiding the collection of dirt and flies, which is especially desirable under certain conditions of application and at certain seasons of the year. Moreover, films of these paints are not injured by exposure to rain shortly after application, whereas ordinary oil paint films of the same age are spotted or washed away under the same circumstances. This is frequently an important factor in successful exterior painting.

As evidenced by several of the above compositions the present invention results in the production of non-toxic paints suitable for outside use. When their consistency is suitably reduced such paints are particularly adapted for application by spraying. For instance, the composition of Example 1 may be altered to the desired spraying consistency by reducing with mineral thinner. Since most durable outside paints heretofore available have usually contained lead pigments in major quantities, and the health hazard attending spraying of such compositions is a serious matter, the spray application of such compositions has necessarily been limited. Examples of classes of pigments and pigment combinations adapted for the production of durable nontoxic outside paints within the scope of the present invention are single pigment titanium and zinc paints and paints containing combinations of titanium and zinc pigments.

It will therefore be apparent that we have developed a new and useful group of coating compositions that are substantially free from cellulose derivatives which have more rapid drying rates, better resistance to chalking, checking, and cracking, better gloss retention, and greater hiding power with fewer coats than compositions heretofore obtainable, and that the colors of the resulting films are more stable.

These coating compositions are valuable in a wide range of commercial applications, such as house paints, freight car paints and paints for general railway use, sign enamels and paints, and metal protective and decorative paints in general.

By the terms "titanium" or "titanium pigment", as used herein, we mean a pigment containing chemical compounds of titanium (for example, titanium oxide), either alone or in conjunction with other modifying or extending ingredients.

By the term "barium base titanium pigment", as used herein, we mean a pigment containing barium sulfate and titanium oxide intimately blended or associated in the process of pigment manufacture, the particular composition referred to herein containing 75% of barium sulfate and 25% of titanium oxide.

By the term "calcium base titanium pigment", as used herein, we mean a pigment containing calcium sulfate and titanium oxide intimately blended or associated in the process of pigment manufacture, the particular composition referred to herein containing 70% of calcium sulfate and 30% of titanium oxide.

By the terms "lithopone base titanium pigment" or "titanium lithopone", as used herein, we mean a pigment containing lithopone and titanium oxide intimately blended or associated in the process of pigment manufacture, the particular composition referred to herein containing 85% of lithopone and 15% of titanium oxide.

By the term "zinc pigments", as used herein, we mean zinc oxide and zinc sulfide pigments as defined hereinafter.

By the term "zinc oxide pigment", as used herein, we mean a pigment containing zinc oxide which pigment does not contain, as an impurity, more than 8% by weight of lead compounds, calculated as lead sulfate.

By the term "zinc sulfide pigment", as used herein, we mean a pigment containing the chemical compound zinc sulfide, either alone or in conjunction with other modifying or extending ingredients.

By the term "lead pigment", as used herein, we mean a pigment of the type represented by basic carbonate white lead and basic sulfate white lead, or mixtures of these, excluding cases in which the lead is present as an impurity in zinc oxide pigments in an amount greater than 8%, calculated as lead sulfate.

By the term "titanium free pigment", as used herein, we mean a pigment containing no titanium.

By the terms "extenders" or "fillers", as used herein, we mean materials which, if incorporated with a modified polyhydric alcohol-polybasic acid resin vehicle, in the amounts in which pigments are ordinarily incorporated to produce enamels or paints, without the addition of a pigment thereto, yield transparent or semi-transparent films.

By the term "substantially free from cellulose derivatives", as used herein, we mean that the material referred to does not contain substantial quantities of cellulose derivative.

Coating compositions falling within the scope of the present invention may also include minor proportions of additional ingredients, other than cellulose derivatives, commonly used as film forming materials, including drying oils, natural resins, synthetic resins, and materials exerting a water repellant or waterproofing action, such as paraffin greases. Where the pigment combination contains a substantial quantity of a reactive pigment, however, it is necessary either to avoid the use of additional acidic ingredients or to restrict the quantity added so that the resulting acidity of the coating composition does not exceed that indicated above as the maximum acid number for the particular oil acids content polyhydric alcohol-polybasic acid resin used.

Although coating compositions containing less than 20% and more than 50% of zinc oxide pigments are disclosed in this application, they are not claimed specifically herein since they are claimed in co-pending application Serial No. 431,041 filed by us of even date herewith.

No claims are made herein to the use of titanium free pigment combinations such as are used with oil type vehicles for outside paints since the combinaton of such pigment combinations (including known colored pigment combinations) with modified polyhydric alcohol-polybasic acid resins to produce durable outside paints is disclosed and claimed in a co-pending application of Hopkins, Serial No. 454,822, filed May 22, 1930, and in Hopkins Patent 1,771,538, issued July 29, 1930. Consequently, no claims are made herein to the use of zinc oxide pigments in pigment combinations containing white lead where the zinc oxide portion of the pigment combination is not greater than 50%; nor the use of zinc oxide pigments in pigment combinations containing lithopone where the zinc oxide portion of the pigment combination is greater than 20% and up to and including 50%. Similarly, no claims are made herein to the use of lead pigments alone.

As many apparently widely different embodiments of this invention may be made without departing from the spirit and scope thereof, it is to be understood that we do not limit ourselves to the specific embodiments thereof except as defined in the appended patent claims.

We claim:

1. A coating composition substantially free from cellulose derivatives which comprises a pigment containing titanium and a vehicle comprising a resin which has, in combined form, the radicals of a polyhydric alcohol, a polybasic acid and an oil having drying properties, the titanium component, including any extender present in the coating composition, constituting at least 65% of the total pigment and extender.

2. A white coating composition substantially free from cellulose derivatives which comprises a pigment containing titanium and a vehicle comprising a resin which has, in combined form, the radicals of glycerol, phthalic anhydride and an oil having drying properties, the titanium component, including any extender present in the coating composition, constituting at least 65% of the total pigment and extender.

3. The coating composition of claim 1, in which the titanium component, including any extender present in the coating composition, is at least 80% of the total pigment and extender.

4. The coating composition of claim 1, in which the pigment consists of a titanium pigment.

In testimony whereof we affix our signatures.

WILLIAM W. LEWERS.
GORDON D. PATTERSON.